United States Patent [19]

Komatsu et al.

[11] Patent Number: 4,555,542

[45] Date of Patent: Nov. 26, 1985

[54] POLYESTER-POLYETHER COPOLYMER COMPOSITION

[75] Inventors: Hideo Komatsu; Hiroyuki Harada; Tomiji Matsuki, all of Ehime, Japan

[73] Assignee: Toray Industries, Inc., Tokyo, Japan

[21] Appl. No.: 564,342

[22] Filed: Dec. 21, 1983

Related U.S. Application Data

[63] Continuation of Ser. No. 347,624, Feb. 10, 1982, abandoned.

[30] Foreign Application Priority Data

Feb. 10, 1981 [JP] Japan ................... 56-17526

[51] Int. Cl.$^4$ ............................. C08K 5/57
[52] U.S. Cl. ........................ 524/178; 524/222; 528/283
[58] Field of Search ............. 524/178, 222; 528/283, 528/301

[56] References Cited

U.S. PATENT DOCUMENTS

| | | | |
|---|---|---|---|
| 2,720,507 | 10/1955 | Caldwell | 528/283 |
| 3,023,192 | 2/1962 | Shivers | 528/301 |
| 3,584,047 | 6/1971 | Dexter et al. | 524/222 |
| 3,839,492 | 6/1958 | Caldwell et al. | 528/283 |
| 3,896,078 | 7/1975 | Hoeschele | 528/301 |
| 3,936,421 | 2/1976 | Hayashi et al. | 528/283 |
| 3,957,905 | 5/1976 | Sumoto et al. | 524/222 |
| 4,094,857 | 6/1978 | Wolfe | 524/222 |
| 4,221,703 | 9/1980 | Hoeschele | 524/222 |
| 4,251,652 | 2/1981 | Tanaka et al. | 528/301 |

FOREIGN PATENT DOCUMENTS 51-144489 12/1976 Japan.
52-6796 1/1977 Japan.

Primary Examiner—Veronica P. Hoke
Attorney, Agent, or Firm—Austin R. Miller

[57] ABSTRACT

A polyester-polyether copolymer composition which comprises a polyester-polyether copolymer composed mainly of an aromatic dicarboxylic acid, 1,4-butanediol, and a polyalkylene glycol of average molecular weight from about 400 to 6,000, an effective amount of organotin compound, and an amide-containing phenolic antioxidant having the following general moiety:

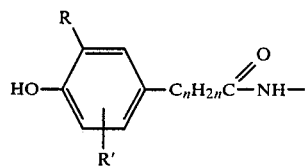

(where R is a secondary or tertiary alkyl group, R' is a hydrogen atom or a secondary or tertiary alkyl group, and n is from 0 to 6).

10 Claims, No Drawings

POLYESTER-POLYETHER COPOLYMER COMPOSITION

This application is a continuation of application Ser. No. 347,624, filed 2/10/82 now abandoned.

BACKGROUND OF THE INVENTION

The polyester-polyether copolymer in which the aromatic polyester units constitute hard segments and the polyalkylene oxide units constitute soft segments has recently been in the spotlight as a new thermoplastic elastomer which will replace conventional natural rubbers and synthetic rubbers.

Having a comparatively low softening point and good flowability, such a polyester-polyether copolymer can be molded economically by conventional molding processes, such as extruding and injection molding, for thermoplastics. In addition, it has outstanding rubbery elasticity, good adhesion, and chemical resistance, and many other good properties. The polyester-polyether having these preferable properties is expected to find many uses such as in tubes, hoses, belts, tires, films, elastic fibers, and so on.

It is known that if an organotin compound is used alone or in combination with an organotitanium compound as a polycondensation catalyst in the production of the polyester-polyether copolymer, a copolymer having a high degree of polymerization and high whiteness can be obtained. (See Japanese Laid-Open Patents No. 52-6796 (1977) and No. 51-144489 (1976).) However, polyester-polyether copolymers are subject to severe deterioration due to oxidation decomposition when exposed to hot air, particularly air hotter than 120° C., for a long time as described in U.S. Pat. Nos. 3896078. This tendency is also found in the polyester-polyether copolymer prepared by using an organotin compound as a polycondensation catalyst.

According to these U.S. Patents, the polyester-polyether copolymer is incorporated with an amide linkage-containing material and an antioxidant or an amide-containing phenolic antioxidant in order to improve the resistance to oxidation. When these compounds are incorporated, the resulting polyester-polyether copolymer is greatly improved in its resistance to oxidation, but is not necessarily satisfactory in performance for practical use. In other words, such a copolymer has poorer mechanical properties and exhibits discoloration on exposure to hot air.

OBJECT OF THE INVENTION

It is an object of the present invention to provide a polyester-polyether copolymer composition which is improved in its resistance to oxidation and less likely to become discolored when exposed to hot air.

DETAILED DESCRIPTION OF THE INVENTION

The dicarboxylic acid component constituting the polyester-polyether copolymer of this invention are dicarboxylic acids containing more than 50 mol% of aromatic dicarboxylic acids. Such aromatic dicarboxylic acids include terephthalic acid, isophthalic acid, phthalic acid, 2,6-naphthalenedicarboxylic acid, 1,5-naphthalenedicarboxylic acid, 1,2-bis(phenoxy)ethane-p,p'-dicarboxylic acid, and diphenyl-p,p'-dicarboxylic acid. Preferable among them are terephthalic acid, isophthalic acid, and a mixture thereof. In addition, aliphatic carboxylic acids or alicylic carboxylic acids such as succinic acid, adipic acid, sebacic acid, 1,4-cyclohexanedicarboxylic acid, and 1,3-cyclohexanedicarboxylic acid can also be used in an amount less than 50 mol%.

The glycol component constituting the polyester-polyether copolymer of this invention are glycols of molecular weight less than 250 containing at least 70 mol% of 1,4-butanediol. Such glycols are exemplified by glycols containing less than 30 mol% of primary diols such as ethylene glycol, 1,3-propanediol, 1,6-hexanediol, diethylene glycol, triethylene glycol, and 1,4-cyclohexanedimethanol. In addition to the aforesaid dicarboxylic acid component and the glycol component, hydroxycarboxylic acids such as p-(β-hydroxyethoxy)benzoic acid and p-hydroxymethylbenzoic acid, and tri- or higher functional polybasic carboxylic acids such as trimellitic acid, trimesic acid, and pyromellitic acid can be used as copolymer components.

The polyalkylene ether glycol component constituting the polyester-polyether copolymer of this invention includes polyethylene glycol, polypropylene glycol, polytetramethylene glycol, and copolymers thereof. Preferable among them are polytetramethylene glycol and polyalkylene glycol copolymers consisting mainly of tetramethylene glycol units. The polyalkylene glycol should preferably have a number-average molecular weight from 400 to 6,000. A polyalkylene glycol having an average molecular weight less than 400 is not preferable because it decreases the blockness of the resulting polyester-polyether copolymer with the resulting decrease in the melting point of the polymer. A polyalkylene glycol having an average molecular weight higher than 6,000 is not preferable either because the resulting polymer suffers from phase separation and tends to become opaque. The weight % of the soft segment units which are composed of repeating units of the polyalkylene glycol component and the dicarboxylic acid component can be selected arbitrarily according to the elastic properties etc. required for the polyester-polyether copolymer. It is usually 10 to 80 wt%, preferably 15 to 70 wt%. The amide group-containing stabilizers used in this invention are described in U.S. Pat. No. 3,584,047 to Dexter et al. These materials are characterized by the presence of from 1 to 4 amide linkage-containing moieties having the following general structure:

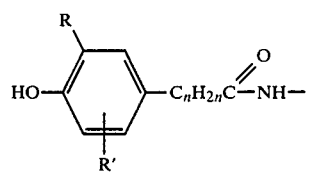

wherein R is secondary or tertiary alkyl group, R' is a hydrogen atom, a secondary or tertiary alkyl group, and n is from zero to six.

The present invention utilizes an amide-containing phenolic antioxidant having at least one hindered phenol group and at least one amide group represented by the following formula:

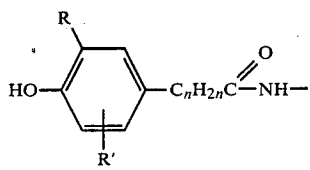

wherein R is a secondary or tertiary alkyl group, R' is a hydrogen atom or a secondary or tertiary alkyl group, and n is from 0 to 6.

Preferable among the amide group-containing stabilizers used in this invention are those stabilizers containing hindered phenol groups and amide groups. A preferable example is 1,6-bis[3-(3,-5-di-tert-butyl-4-hydroxyphenyl)propionamido]hexane (produced by Ciba-Geigy, trade name "IRGANOX" 1098). Other examples of the above amide-containing phenolic antioxidants are as follows:

1,6-bis[3,5-di-tert-butyl-4-hydroxyphenylacetamido)-hexane,
1,6-bis[3-(3-methyl-4-hydroxy-5-tert-butylphenyl)propionamido]hexane,
1,6-bis[α-(3,5-di-tert-butyl-4-hydroxyphenyl-)isobutylamido]hexane,
1,4-bis[3-(3,5-di-tert-butyl-4-hydroxyphenyl)-propionamidomethyl]cyclohexane,
1,2-bis[3-(3,5-di-tert-butyl-4-hydroxyphenyl)propionamido]ethane,
tetrakis[3-(3,5-di-tert-butyl-4-hydroxyphenyl)propionamidomethyl]methane, and
N,N'-bis[3-(3,5-di-tert-butyl-4-hydroxyphenyl)propionyl]piperazine.

The amide group-containing stabilizer is added in an amount from 0.05 to 1.0 wt%, preferably from 0.1 to 0.5 wt%, based on the polyester-polyether copolymer. If the amide group-containing stabilizer is added in too small quantities, the stabilizing effect is not obtained. Excessive addition causes discoloration of the resulting polymer.

The tin compound used in this invention is preferably an organotin compound such as monalkyl tin compounds, monoaryl tin compounds, dialkyl tin compounds, diaryl tin compounds, trialkyl tin compounds, triaryl tin compounds, and tetra-aralkyl tin compounds. Specifically, the following tin compounds are used preferably.

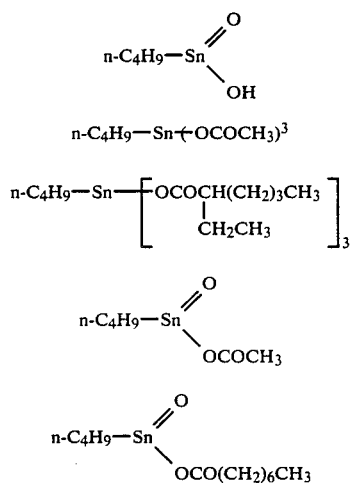

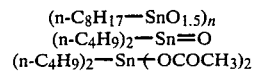

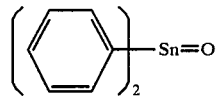

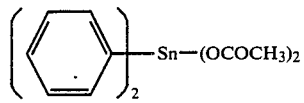

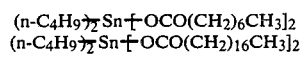

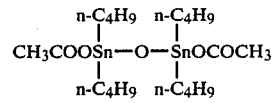

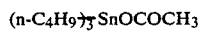

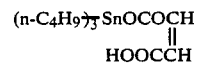

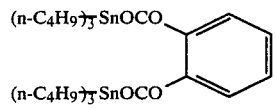

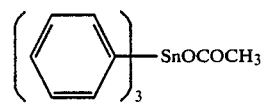

Among the organotin compounds represented by the above formulas, monoalkyl tin compounds such as mono-n-butyl-monohydroxy tin oxide (I), mono-n-butyl tin triacetate (II), mono-n-butyl tin monoacetate (IV), and mono-n-butyl tin mono-n-caprylate (V) are effective as a catalyst for esterification. The tin compound is added in an amount from about 0.001 to 0.15 wt%, preferably from 0.002 to 0.1 wt%, tin based on the polyester-polyether copolymer. If the quantitiy of the tin compound added is too small, sufficient stabilizing and discoloration preventive effects are not obtained; and if the quantity added is too large, the resulting polymer tends to become disclored and form foreign matters.

The knowm methods for producing polyester-polyether copolymers are the direct polymerization method and the ester interchange polymerization method. In the former method, the dicarboxylic acid, the glycol, and the polyalkylene ether glycol undergo esterification and then polycondensation. In the latter method, the diester of carboxylic acid, the glycol, and the polyalkylene ether glycol undergo ester interchange and then polycondensation. The direct polymerization method is economically advantageous in view of the raw material cost and the ease of recovery and reuse of the by-product tetrahydrofuran.

A detailed description is given below of the process for producing polyester-polyether copolymers by the direct polymerization method, and the preferable timing for adding an amide group-containing stabilizer and a tin compound.

Into an esterification reactor equipped with a stirrer and fractionating column are charged for esterification a dicarboxylic acid composed mainly of an aromatic dicarboxylic acid, a glycol of molecular weight less than 250 composed mainly of 1,4-butanediol, a ether glycol of molecular weight from 400 to 6,000 and an esterification catalyst. The molar ratio of the glycol of molecular weight less than 250 to the dicarboxylic acid should preferably be from 1.3 to 2.5, more preferably from 1.6 to 2.2.

The esterification catalyst is preferably a titanium compound such as a tetra-alkyl titanate, a reaction product of tetra-alkyl titanate and alkylene glycol, a partial hydrolyzate, of tetra-alkyl titanate, a metal salt of titanium hexa-alkoxide, a titanium salt of carboxylic acid, or a titanyl compound. The esterification catalyst is preferably added in an amount from 0.01 to 0.5 wt%, more preferably from 0.03 to 0.2 wt%, based on the resulting polymer.

The esterification is usually performed in such a manner that the temperature is raised slowly from about 150° C. to 240° C. under normal pressure and the water and tetrahydrofuran which are formd in the reaction are distilled away through the fractionating column. The time required for esterification varies depending on the composition of raw materials, the kind and quantity of catalyst, the reaction temperature, etc. of the reaction system. Usually, it is about 2 to 7 hours. On completion of the esterification, a polycondensation catalyst is added to the reaction system, and the reaction products are transferred to a polycondensation reactor, in which polycondensation is performed under a high vacuum of 1 mmHg or less at 230° to 260° C. for several hours until a polyester-polyether copolymer having the desired degree of polymerization is obtained.

Incidentally, the polycondensation may be performed by adding a polyalkylene glycol after the esterification of the dicarboxylic acid and the low-molecular weight glycol.

The amide group-containing stabilizer used in this invention should preferably be added after completion of the esterification, particularly after the esterification has reached 95% or more. It may be incorporated into the resulting polymer using an extruder and the like.

The tin compound, particularly a monoalkyl tin compound, used in this invention should preferably be added before the esterification because it usually acts as an esterification catalyst. However, it is also possible to add the tin compound after completion of the esterification and to incorporate it into the resulting polymer using an extruder and the like.

The polyester-polyether copolymer composition obtained as mentioned above has better mechanical properties is less likely to discolor and is highly resistant to oxidation decomposition when exposed to hot air. The stabilized polyester-polyether copolymer composition of this invention is outstanding in its resistance to oxidation, and therefore it will be used preferably in applications such as tubes, hoses, belts, electric parts, wire coverings, and automotive parts.

The invention will be described in detail with reference to the following examples, which are not intended to limit the scope of the invention. The characteristic properties of the polymers in the examples were measured according to the following methods.

(1) Relative viscosity

Eight grams of the polymer were dissolved in 100 ml of o-chlorophenol at 100° C. for about 1 hour, and left standing. The relative viscosity of the solution was measured at 25° C. using an Ostwald viscometer.

(2) Heat resistance

A sample of the polymer was vacuum dried at 100° C. for 4 hours, and then press molded at 240° C. into a 1 m thick sheet. Dumbbell specimens conforming to ASTM No. 3 were punched from the sheet. The specimens were subjected to heat treatment in a Geer oven at 150° C. and the time for the specimens to lose 50% of the initial value of breaking elongation was obtained. The time for elongation to decrease to a half, or the heat life, was used as an index for heat resistance.

(3) Polymer color

Value L, value a, and value b were measured for cylindrical chip samples using an automatic color and color difference meter (Hunter type, made by Toyo Rika Kogyo Co., Ltd.)

EXAMPLES 1 TO 9, COMPARATIVE EXAMPLES 1 AND 2

Into an esterification reactor equipped with a stirrer and fractionating column were charged 54.2 parts of terephthalic acid, 52.9 parts of 1,4-butanediol, 31.0 parts of polytetramethylene glycol having a number-average molecular weight of 1000, 0.04 part of tetrabutyl titanate, and a tin compound as shown in Table 1. The reactants were heated slowly from 160° C. to 230° C. so as to carry out esterification. The water and tetrahydrofuran formed in the reaction were distilled away through the fractionating column. The time required for completion of the esterification is shown in Table 1. It is to be noted that the esterification time was reduced to a great extent when a monoalkyl tin compound was added.

After completion of the esterification, 0.10 part of tetrabutyl titanate as a polycondensation catalyst was added in the form of a solution in a small quantity of 1,4-butanediol, and then 0.25 part of "IRGANOX" 1098 (made by Nippon Ciba-Geigy Co., Ltd.) as an amide-containing stabilizer, in the form of a suspension in a small quantity of 1,4-butanediol. The reaction product of the esterification was transferred to a polycondensation reactor. The reactor was evacuated slowly from normal pressure to 1 mmHg or less over a period of 1 hour. At the same time the reactants were heated to 245° C. The polycondensation was performed at 245° C. under a pressure of 1 mmHg or less for 3.0 hours. Table 1 shows the heat resistance (thermal life at 150° C.), the discoloration of chips after treatment at 150° C. in air for 8 hours, and other properties of the resulting polymer. It is to be noted that the polymers obtained in Examples 1 to 9 in which a tin compound was added in an effective amount are much superior in heat resistance to those obtained in Comparative Example 1 in which no tin compound was added. In addition, the polymers obtained in the Examples underwent only slight discoloration when subjected to heat treatment at 150° C. in air for 8 hours. The discoloration caused by the heat treatment is compared in terms of the change in the value of a ($\Delta a$). For polymers of Examples 1 to 9, $\Delta a$ is 2.8 to 4.6, whereas for the polymer of Comparative Example 1, in which no tin compound was added, $\Delta a$ is about 9. The polyester-polyether copolymer composition of this invention took on only a slight red brown color when subjected to heat treatment. In the meantime, in Comparative Example 2 in which the tin compound was added in an amount less than the lower limit of the preferable range, almost no effect was observed in the improvement of heat resistance and in the prevention of discoloration during heat treatment.

COMPARATIVE EXAMPLES 3 to 6

Polyester-polyether copolymers were prepared as in Examples 1 to 3, and 5 and Comparative Example 1, except that "IRGANOX" 1098 was replaced by 0.25 part of "IRGANOX" 1010 (made by Nippon Ciba-Geigy Co., Ltd., a stabilizer containing no amide). Table 2 shows the heat resistance (thermal life at 150° C.) of the resulting polymers and the discoloration of chips after treatment at 150° C. in air for 8 hours. It is to be noted that the polymers without the amide-containing stabilizer, regardless of the presence of a tin compound, are extremely poor in heat resistance although the discoloration caused by the heat treatment at 150° C. in air is small.

EXAMPLES 10 to 18, COMPARATIVE EXAMPLES 7 and 8

Into an esterification reactor equipped with a stirrer and fractionating column were charged 46.1 parts of terephthalic acid, 5.1 parts of isophthalic acid, 50.0 parts of 1,4-butanediol, 0.034 part of tetrabutyl titanate, and a tin compound as shown in Table 3. The reactants were heated slowly from 160° C. to 230° C. so as to carry out esterification. The water and tetrahydrofuran formed in the reaction were distilled away through the fractionating column. The time required for completion of esterification is shown in Table 3. It is to be noted that the esterification time was reduced to a great extent when a monoalkyl tin compound was added After completion of the esterification, the reaction product of the esterification was transferred to a polycondensation reactor, and 35.4 parts of polytetramethylene glycol having a number-average molecular weight of 1,000 was added. Then 0.12 part of tetrabutyl titanate as a polycondensation catalyst was added in the form of a solution in a small quantity of 1,4-butanediol, and further 0.30 part of "IRGANOX" 1098 (made by Nippon Ciba-Geigy Co., Ltd) as an amide-containing stabilizer was added in the form of a suspension in a small quantity of 1,4-butanediol. The reactor was evacuated slowly from normal pressure to 1 mmHg or less over a period of 1 hour. At the same time the reactants were heated to 245° C. The polycondensation was performed at 245° C. under a pressure of 1 mmHg or less for 3.0 hours. Table 3 shows the heat resistance (thermal life at 150° C.), the discoloration of chips after treatment at 150° C. in air for 8 hours, and other properties of the resulting polymer. It is to be noted that the polymers obtained in Examples 10 to 18, in which a tin compound was added in an effective amount, are much superior in heat resistance to the polymer obtained in Comparative Example 7 in which no tin compound was added. In addition, the polymers obtained in the Examples underwent only slight discoloration when subjected to heat treatment at 150° C. in air for 8 hours. The discoloration caused by the heat treatment is compared in terms of the change in the value of a ($\Delta a$). For the polymers of Examples 10 to 18, $\Delta a$ is 2.5 to 4.4, whereas for the polymer of Comparative Example 7, in which no tin compound was added, $\Delta a$ is about 9. The polyester-polyether copolymer composition of this invention took only a slight red brown color when subjected to heat treatment. In the meantime, in Comparative Examples 8 in which the tin compound was added in an amount less than the lower limit of the preferable range, almost no effect was observed in the improvement of heat resistance and the prevention of discoloration in heat treatment.

TABLE 1

| | Tin Compounds | | Time of esteri-fication (hr:min) | Resulting Polymer | | | | | | | $\Delta a$ due to heat treatment |
|---|---|---|---|---|---|---|---|---|---|---|---|
| | Name | Q'ty added (wt %)* | | Relative viscosity | Thermal life at 150° C. (hours) | Chip color (after polymerization) | | | Chip color (After heat treatment)** | | |
| | | | | | | L | a | b | L | a | b | |
| Ex. 1 | Mono-n-butyl-mono-hydroxy tin oxide | 0.017 | 3:01 | 66 | 176 | 77.0 | −4.3 | 15.0 | 76.4 | −1.5 | 13.7 | 2.8 |
| Ex. 2 | Mono-n-butyl-mono-hydroxy tin oxide | 0.006 | 3:11 | 67 | 141 | 78.6 | −2.9 | 12.3 | 72.6 | +0.2 | 13.1 | 3.1 |
| Ex. 3 | Mono-n-butyl tin triacetate | 0.017 | 2:54 | 69 | 163 | 78.0 | −4.8 | 16.2 | 77.7 | −2.1 | 14.3 | 2.7 |
| Ex. 4 | Mono-n-butyl tin mono-n-caprylate | 0.017 | 3:07 | 68 | 170 | 76.5 | −4.3 | 16.5 | 75.3 | −1.1 | 14.8 | 3.2 |
| Ex. 5 | Di-n-butyl tin oxide | 0.017 | 3:32 | 68 | 156 | 77.8 | −3.4 | 13.2 | 72.0 | +1.2 | 14.3 | 4.6 |
| Ex. 6 | Di-n-butyl tin dibutyrate | 0.017 | 3:33 | 69 | 159 | 79.0 | −3.3 | 13.1 | 72.5 | +0.8 | 14.0 | 4.1 |
| Ex. 7 | Di-n-butyl tin distearate | 0.017 | 3:28 | 68 | 152 | 78.2 | −3.1 | 12.6 | 72.0 | +1.1 | 14.1 | 4.2 |
| Ex. 8 | Tri-n-butyl tin maleate | 0.017 | 3:40 | 70 | 151 | 79.0 | −3.4 | 13.0 | 73.5 | +0.5 | 14.0 | 3.9 |
| Ex. 9 | Tri-n-butyl tin phthalate | 0.017 | 3:34 | 67 | 147 | 78.5 | −4.0 | 15.6 | 75.2 | +0.2 | 14.1 | 4.2 |
| Comp. Ex. 1 | None | — | 3.40 | 69 | 95 | 79.5 | −1.9 | 10.3 | 68.4 | 6.9 | 16.3 | 8.8 |
| Comp. Ex. 2 | Mono-n-butyl-mono-hydroxy tin oxide | 0.001 | 3:41 | 69 | 98 | 78.9 | −2.0 | 10.8 | 70.2 | +6.4 | 16.0 | 8.4 |

Note
*wt % of tin atom based on polymer.
**Color of polymer chips treated at 150° C. in air for 8 hours.

TABLE 2

| | Tin Compounds | | | Resulting Polymer | | | | | | |
|---|---|---|---|---|---|---|---|---|---|---|
| | | Q'ty added (wt %)* | Relative viscosity | Thermal life at 150° C. (hours) | Chip color (after polymerization) | | | Chip color (after heat treatment)** | | |
| | Name | | | | L | a | b | L | a | b |
| Comp. Ex. 3 | Mono-n-butyl-mono-hydroxy tin oxide | 0.017 | 69 | 32 | 81.5 | −3.8 | 10.6 | 78.1 | −2.6 | 11.3 |
| Comp. Ex. 4 | Mono-n-butyl tin triacetate | 0.017 | 72 | 34 | 80.7 | −4.1 | 10.5 | 77.4 | −2.7 | 11.8 |
| Comp. Ex. 5 | Di-n-butyl tin oxide | 0.017 | 71 | 29 | 80.9 | −2.8 | 9.1 | 78.3 | −1.4 | 10.6 |
| Comp. Ex. 6 | None | — | 72 | 23 | 81.7 | −2.1 | 8.4 | 79.5 | −0.4 | 10.3 |

Note
*wt % of tin atom based on polymer.
**Color of polymer chips treated at 150° C. in air for 8 hours.

TABLE 3

| | Tin Compounds | | Time of esterification (hr:min) | Resulting Polymer | | | | | | | | Δa due to heat treatment |
|---|---|---|---|---|---|---|---|---|---|---|---|---|
| | | Q'ty added (wt %)* | | Relative viscosity | Thermal life at 150° C. (hours) | Chip color (after polymerization) | | | Chip color (after heat treatment)** | | | |
| | Name | | | | | L | a | b | L | a | b | |
| Ex. 10 | Mono-n-butyl-mono-hydroxy tin oxide | 0.017 | 3:24 | 73 | 169 | 74.2 | −4.1 | 15.6 | 74.0 | −1.3 | 14.1 | 2.8 |
| Ex. 11 | Mono-n-butyl-mono-hydroxy tin oxide | 0.006 | 3:39 | 74 | 140 | 75.6 | −2.8 | 12.7 | 70.9 | +0.5 | 13.5 | 3.3 |
| Ex. 12 | Mono-n-butyl tin triacetate | 0.017 | 3:28 | 76 | 170 | 75.1 | −4.5 | 16.6 | 75.3 | −2.0 | 14.6 | 2.5 |
| Ex. 13 | Mono-n-butyl tin mono-n-caprylate | 0.017 | 3:31 | 75 | 165 | 73.4 | −4.0 | 16.5 | 72.9 | −0.9 | 15.0 | 3.1 |
| Ex. 14 | Di-n-butyl tin oxide | 0.017 | 4:00 | 75 | 158 | 74.6 | −3.2 | 13.7 | 70.4 | +1.2 | 14.6 | 4.4 |
| Ex. 15 | Di-n-butyl tin dibutyrate | 0.017 | 3:57 | 76 | 155 | 76.1 | −3.3 | 13.6 | 70.8 | +1.0 | 14.4 | 4.3 |
| Ex. 16 | Di-n-butyl tin distearate | 0.017 | 3:56 | 74 | 151 | 75.3 | −3.2 | 13.0 | 70.5 | +0.9 | 14.7 | 4.1 |
| Ex. 17 | Tri-n-butyl tin maleate | 0.017 | 4:08 | 75 | 147 | 76.1 | −3.2 | 13.5 | 71.4 | +0.8 | 15.1 | 4.0 |
| Ex. 18 | Tri-n-butyl tin phthalate | 0.017 | 3:58 | 74 | 145 | 75.2 | −3.8 | 15.9 | 73.7 | +0.3 | 14.3 | 4.1 |
| Comp. Ex. 7 | None | — | 4.10 | 75 | 88 | 76.3 | −1.6 | 11.4 | 67.6 | +7.6 | 17.4 | 9.2 |
| Comp. Ex. 8 | Mono-n-butyl-tin triacetate | 0.001 | 4:08 | 76 | 90 | 76.0 | −1.6 | 11.8 | 68.2 | +7.5 | 17.2 | 9.1 |

Note
*wt % of tin atom based on polymer.
**Color of polymer chips treated at 150° C. in air for 8 hours.

We claim:

1. A stabilized polyester-polyether copolymer composition having improved thermal life and color change properties when exposed to air hotter than 120° C. which comprises a polyester-polyether copolymer composed mainly of an aromatic dicarboxylic acid, 1,4-butane diol and a polyalkylene ether glycol of average molecular weight from about 400 to about 6,000, about 0.002% to 0.1% by weight of a monalkyl tin compound based on the amount of tin in the monalkyl tin compound, and about 0.1% to about 0.5% by weight of an amide-containing phenolic antioxidant based on the weight of the polyester-polyether copolymer composition, the antioxidant having at least one hindered phenol group and at least one amide group represented by the following formula:

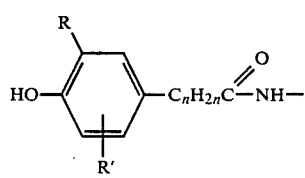

where R is a secondary or tertiary alkyl group, R' is a hydrogen atom or a secondary or tertiary alkyl group, and n is from 0 to 6.

2. A composition as claimed in claim 1, wherein the blending ratio of the monoalkyl tin compound in terms of the quantity of tin atom in said monoalkyl tin compound is about 0.001 to 0.15% by weight based on the weight of the polyester-polyether copolymer composition and the blending ratio of the amide-containing phenolic antioxidant is about 0.05 to about 1.0% by weight based on the weight of the polyester-polyether copolymer composition.

3. A composition as claimed in claim 2, wherein the blending ratio of the monoalkyl tin compound in terms of the quantity of tin atom in said monoalkyl tin compound is about 0.002 to 0.1% by weight based on the weight of the polyester-polyether copolymer composition and the blending ratio of the amide-containing phenolic antioxidant is about 0.1 to 0.5% by weight based on the weight of the polyester-polyether copolymer composition.

4. A composition as claimed in claim 1, wherein the monoalkyl tin compound is at least one member selected from the group consisting of mono-n-butyl monohydroxy tin oxide, mono-n-butyl tin triacetate, mono-n-butyl tin monooctylate, and mono-n-butyl tin monoacetate.

5. A composition as claimed in claim 1, wherein the amide-containing phenolic antioxidant is 1,6-bis[3-(3,5-di-tert-butyl-4-hydroxyphenyl)propionamido]hexane.

6. A composition as claimed in claim 1, wherein the polyester-polyether copolymer composition is incorporated with an organotitanium compound in an amount of about 0.1 to 0.5% by weight based on the weight of said composition.

7. A composition as claimed in claim 6, wherein the organotitanium compound is at least one member selected from the group consisting of tetra-alkyl titanates, reaction products of tetra-alkyl titanate and alkylene glycol, partially hydrolyzed products of tetra-alkyl titanate, metal salts of titanium hexa-alkoxide, titanium salts of carboxylic acid, and titanyl compounds.

8. A composition as claimed in claim 1, wherein the polyester-polyether copolymer contains the repeating units consisting of the polyalkylene glycol component and the dicarboxylic acid component in an amount of about 10 to about 80% by weight based on the weight of the copolymer.

9. A stabilized polyester-polyether copolymer composition having a thermal life when exposed to hot air at 150° C. of at least 150 hours and a color change at 150° C. for 8 hours of less than 3.0 which comprises a polyester-polyether copolymer composed mainly of an aromatic dicarboxylic acid, 1,4-butane diol and a polyalkylene ether glycol of average molecular weight from about 400 to about 6,000, about 0.002% to 0.1% of a monoalkyl tin compound based on the amount of tin in the monoalkyl tin compound and about 0.1% to about 0.5% by weight of an amide-containing phenolic antioxidant based on the weight of the polyester-polyether copolymer composition, the antioxidant having at least one hindered phenol group and at least one amide group represented by the formula:

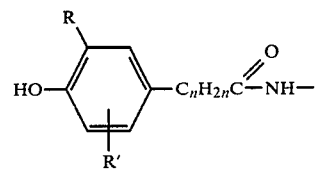

where R is a secondary or tertiary alkyl group, R' is a hydrogen atom or a secondary or tertiary alkyl group, and n is from 0 to 6.

10. A stabilized polyester-polyether copolymer composition having a thermal life when exposed to hot air at 150° C. of at least 150 hours and a color change at 150° C. for 8 hours of less than 3.0 which comprises a polyester-polyether copolymer composed mainly of an aromatic dicarboxyic acid, 1,4-butane diol, and a polyalkylene ether glycol of average molecular weight from about 400 to about 6,000, about 0.002% to 0.1% of a monoalkyl tin compound based on the amount of tin in the monoalkyl tin compound and about 0.1% to about 0.5% by weight of an amide-containing phenolic antioxidant based on the weight of the polyester-polyether copolymer composition, the antioxidant having at least one hindered phenol group and at least one amide group represented by the formula:

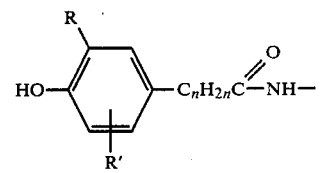

where R is a secondary or tertiary alky group, R' is a hydrogen atom or a secondary or tertiary alkyl group, and n is from 0 to 6.

* * * * *

UNITED STATES PATENT AND TRADEMARK OFFICE
CERTIFICATE OF CORRECTION

PATENT NO. : 4,555,542
DATED : November 26, 1985
INVENTOR(S) : Hideo Komatsu, et al It is certified that error appears in the above-identified patent and that said Letters Patent is hereby corrected as shown below:

Delete claim 10 due to the fact that it is an exact duplication of claim 9.

On the title page "10 Claims" should read -- 9 Claims --.

Signed and Sealed this

Tenth Day of November, 1987

Attest:

DONALD J. QUIGG

Attesting Officer

Commissioner of Patents and Trademarks